United States Patent
Petrenko et al.

(10) Patent No.: US 6,832,742 B2
(45) Date of Patent: *Dec. 21, 2004

(54) SYSTEM AND METHOD FOR AN ELECTRICAL DE-ICING COATING

(75) Inventors: Victor Petrenko, Lebanon, NH (US); Lev Deresh, Plainfield, NH (US)

(73) Assignee: The Trustees of Dartmouth College, Hanover, NH (US)

(*) Notice: Subject to any disclaimer, the term of this patent is extended or adjusted under 35 U.S.C. 154(b) by 19 days.

This patent is subject to a terminal disclaimer.

(21) Appl. No.: 10/169,533
(22) PCT Filed: Dec. 28, 2000
(86) PCT No.: PCT/US00/35529
§ 371 (c)(1), (2), (4) Date: Nov. 7, 2002
(87) PCT Pub. No.: WO01/49564
PCT Pub. Date: Jul. 12, 2001

(65) Prior Publication Data
US 2003/0205642 A1 Nov. 6, 2003

Related U.S. Application Data

(63) Continuation of application No. 09/426,685, filed on Oct. 25, 1999, now Pat. No. 6,027,075.
(60) Provisional application No. 60/173,920, filed on Dec. 30, 1999.
(51) Int. Cl.[7] .............................................. B64D 15/00
(52) U.S. Cl. .............................. 244/134 R; 244/134 D; 205/628
(58) Field of Search ........................ 244/134 R, 134 D, 244/134 F; 205/628, 630, 742; 204/242; 219/770, 772, 213; 324/693, 694

(56) References Cited

U.S. PATENT DOCUMENTS

| 3,204,084 | A | | 8/1965 | Spencer, Jr. et al. |
| 3,825,371 | A | | 7/1974 | Roder et al. |
| 4,732,351 | A | | 3/1988 | Bird |
| 4,737,618 | A | | 4/1988 | Barbier et al. |
| 4,760,978 | A | | 8/1988 | Schuyler et al. |
| 6,027,075 | A | * | 2/2000 | Petrenko ................. 244/134 R |
| 6,427,946 | B1 | * | 8/2002 | Petrenko ................. 244/134 R |
| 6,576,115 | B2 | * | 6/2003 | Petrenko ..................... 205/628 |

* cited by examiner

Primary Examiner—Jack Keith
Assistant Examiner—Gabriel S. Sukman
(74) Attorney, Agent, or Firm—Lathrop & Gage, LC

(57) ABSTRACT

A system for modifying ice adhesion strength of ice adhered to an object comprises a composite coating containing wire electrodes covering the surface to be protected. In one embodiment, a composite coating contains electrode wires and insulator fibers. The composite coating is applied to the surface of an object on which the ice adhesion strength is to be modified. The electrode wires are connected to a dc bias source, and they function as cathodes and anodes alternately. The source generates a DC bias to an interface between the ice and the surface when the ice completes the circuit between anode and cathode wires. In another embodiment, a wire mesh is disposed on an electrically conductive surface of the object an opposing DC biases are applied to the mesh and the surface. In another embodiment, the coating has anode and cathode wires woven by insulator fibers as a composite cloth applied to the surface to protect the surface from ice.

27 Claims, 4 Drawing Sheets

SYSTEM AND METHOD FOR AN ELECTRICAL DE-ICING COATING

CROSS REFERENCE TO RELATED APPLICATION

This application is a continuation-in-part application which claims the priority of prior application Ser. No. 09/426,685, filed Oct. 25, 1999, entitled "Method And Apparatus For Modifying Ice Adhesion Strength", now U.S. Pat. No. 6,027,075 which is hereby incorporated by reference into this application which claims the benefit of Provisional Application No. 60/173,920, filed Dec. 30, 1999.

U.S. GOVERNMENT RIGHTS

This invention was made in part with the support of the U.S. Government; the U.S. Government has certain rights in this invention as provided for by the terms of Grant #DAAH 04-95-1-0189 awarded by the Army Research Office and of Grant #MSS-9302792 awarded by the National Science Foundation.

BACKGROUND OF THE INVENTION

1. Field of the Invention

The invention relates to methods, systems and structures for modifying ice adhesion strength between ice and selected objects. More particularly, the invention relates to methods, systems and structures that apply electrical energy to the interface between ice and objects so as to either increase or decrease the ice adhesion strength to facilitate desired results.

2. Statement of the Problem

Ice adhesion to certain surfaces causes many problems. For example, excessive ice accumulation on aircraft wings endangers the plane and its passengers. Ice on ship hulls creates navigational difficulties, the expenditure of additional power to navigate through water and ice, and certain unsafe conditions. The need to scrape ice that forms on automobile windshields is regarded by most adults as a bothersome and recurring chore; and any residual ice risks driver visibility and safety.

Icing and ice adhesion also causes problems with helicopter blades, and with public roads. Billions of dollars are spent on ice and snow removal and control. Ice also adheres to metals, plastics, glasses and ceramics, creating other day-to-day difficulties. Icing on power lines is also problematic. Icing adds weight to the power lines which causes power outages, costing billions of dollars in direct and indirect costs.

In the prior art, methods for dealing with ice adhesion vary, though most techniques involve some form of scraping, melting or breaking. For example, the aircraft industry utilizes a deicing solution such as ethyl glycol to douse aircraft wings so as to melt the ice thereon. This process is both costly and environmentally hazardous; however, the risk to passenger safety warrants its use. Other aircraft utilize a rubber tube aligned along the front of the aircraft wing, whereby the tube is periodically inflated to break any ice disposed thereon. Still other aircraft redirect jet engine heat onto the wing so as to melt the ice.

These prior art methods have limitations and difficulties. First, prop-propelled aircraft do not have jet engines. Secondly, rubber tubing on the front of aircraft wings is not aerodynamically efficient. Third, de-icing costs are extremely high, at $2500–$3500 per application; and it can be applied up to about ten times per day on some aircraft. With respect to other types of objects, heating ice and snow is common. But, heating of some objects is technically impractical. Also, large energy expenditures and complex heating apparati often make heating too expensive.

The above-referenced problems generally derive from the propensity of ice to form on and stick to surfaces. However, ice also creates difficulties in that it has an extremely low coefficient of friction. Each year, for example, ice on the roadway causes numerous automobile accidents, costing both human life and extensive property damage. If automobile tires gripped ice more efficiently, there would likely be fewer accidents.

U.S. Pat. No. 6,027,075, incorporated herein by reference, discloses certain embodiments of an invention in which electrical energy in the form of a direct current ("DC") bias is applied to the interface between ice and the object that the ice covers. As a result, the ice adhesion strength of the ice to the surface of the object is modified. Typically, the ice adhesion strength is decreased, making it possible to remove ice from the object by wind pressure, buffeting or light manual brushing. In other applications, the ice adhesion strength between ice and surfaces of objects in contact with the ice are increased. For example, when the ice adhesion strength is increased between automobile tires and icy roadways, there is less slippage and fewer accidents. In general, if a charge is generated at the interface of ice in contact with a object, it is possible to selectively modify the adhesion between the ice and the object.

In general, U.S. Pat. No. 6,027,075 discloses a power source connected to apply a DC voltage across the interface between ice and the surface upon which the ice forms. By way of example, the object having the conductive surface can be an aircraft wing or a ship's hull (or even the paint applied to the structure). U.S. Pat. No. 6,027,075 discloses a first electrode connected with the surface; a nonconductive or electrically insulating material is applied as a grid over the surface; and a second electrode is formed by applying a conductive material, for example conductive paint, over the insulating material, but without contacting the surface. A practical problem, however, with the grid electrode system disclosed in U.S. Pat. No. 6,027,075 is formation of the grid electrodes and associated insulating layers. The individual components of the grid system, including electrodes, wiring and insulators, are fabricated on a small scale. Photolithographic techniques are capable of fabricating such grid systems. Photolithography is used very effectively in integrated circuit fabrication. The use of photolithography to form a grid system for modifying ice adhesion, however, is less suitable. It involves a large number of patterning and etching steps. Applied to ice control technology, photolithography is expensive, complicated and unreliable.

SOLUTION

The present invention replaces the grid described in U.S. Pat. No. 6,027,075. An embodiment of the present invention provides a composite coating comprising separate, closely spaced wire electrodes separated by insulator fibers. The wire electrodes and insulator fibers are typically woven together using known and reliable industrial technologies. The wire electrodes are connected alternately to a DC power source in such a manner to function as cathodes and anodes. The composite coating is durable and flexible, and is typically applied to the surface to be protected using conventional adhesives. The metal wires may be gold, platinum-plated titanium or niobium, or other material with high resistance to electro-corrosion. As dielectric insulator fibers, nylon, glass or other dielectric material may be used. The dielectric fibers keep the metal electrodes apart, while providing coating integrity. In addition, the dielectric insulator fibers electrically insulate the wire electrodes from the surface on which the composite coating is applied. Typical wire diameters are in the range of from 10 to 100 $\mu$m, with the same range of open space between the electrode wires and insulator fibers. If ice forms in and over the composite coating, a dc bias is applied to the electrodes. As a result, the ice adhesion strength at the interface of the ice and the surface of the object being protected is modified.

In another embodiment of the invention, the wire electrodes of a composite coating are connected to a DC bias source so that they have the same DC bias. The surface on which the composite coating is applied is electrically conductive and has an opposite DC bias. Ice formed in the spaces of the composite coating close the electrical circuit.

In another embodiment of the invention, a wire mesh comprising electrically conductive wires is formed. The wire mesh is disposed on an electrically conductive surface, with an insulating layer interposed between the wire mesh and the surface. A DC bias is applied to the wire mesh and an opposite DC bias is applied to the surface. Ice that is formed in the spaces of the wire mesh closes the electrical circuit.

Those skilled in the art should appreciate that the above-described system can be applied to surfaces of many objects where it is desired to reduce ice adhesion strength, such as on car windshields, airplane wings, ship hulls and power lines. When the invention takes the form of a composite cloth, it contains both the functional anodes and cathodes necessary for the system to work. Therefore, it is not important whether the surface of the object to be protected is electrically conductive or nonconductive.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE PREFERRED EMBODIMENTS

Figure 1:
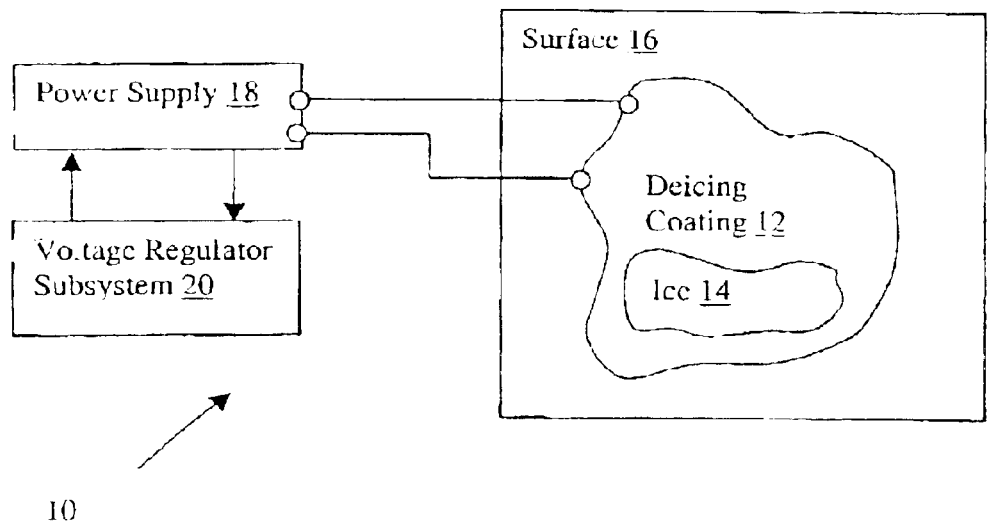
FIG. 1 shows a deicing system incorporating an electrical coating to deice surfaces in accord with the invention.

The invention includes methods, systems and structures which modify ice adhesion strength to objects such as metals and semiconductors by application of a DC bias to the interface between the ice and the objects. FIG. 1 shows one system 10 incorporating an electrical deicing coating 12 to affect ice 14 that might adhere to surface 16. Surface 16 may for example be an airplane wing, helicopter blade, jet inlet, heat exchanger for kitchen and industrial equipment, refridgerator, road signs, ship overstructures, or other object subjected to cold, wet and ice conditions. More specifically, coating 12 is applied over surface 16 to protect surface 16 from ice 14. Coating 12 is preferably flexible so as to physically conform to the shape of surface 16. In operation, a voltage is applied to coating 12 by power supply 18. Typically this voltage is over two volts and generally between two and one hundred volts, with higher voltages being applied for lower temperatures. By way of example, for a temperature of −10C and an anode-to-cathode spacing of 50 $\mu$m within coating 12 (described in more detail below), approximately 20V is applied to coating 12 to provide 10 mA/cm^2 current density through very pure atomspheric ice such as found on airplane wings.

When voltage is applied, ice 14 decomposes into gaseous oxygen and hydrogen through electrolysis. Further, gases form within ice 14 generating high-pressure bubbles that exfoliate ice 14 from coating 12 (and hence from surface 16). Typical current density applied to coating 12 is between about 1–10 mA/cm^2. If desired, voltage regulator subsystem 20 is connected in feedback with power supply 18, and hence with the circuit formed by coating 12 and ice 14, so as to increase or decrease DC voltage applied to coating 12 according to optimum conditions.

Figure 2:
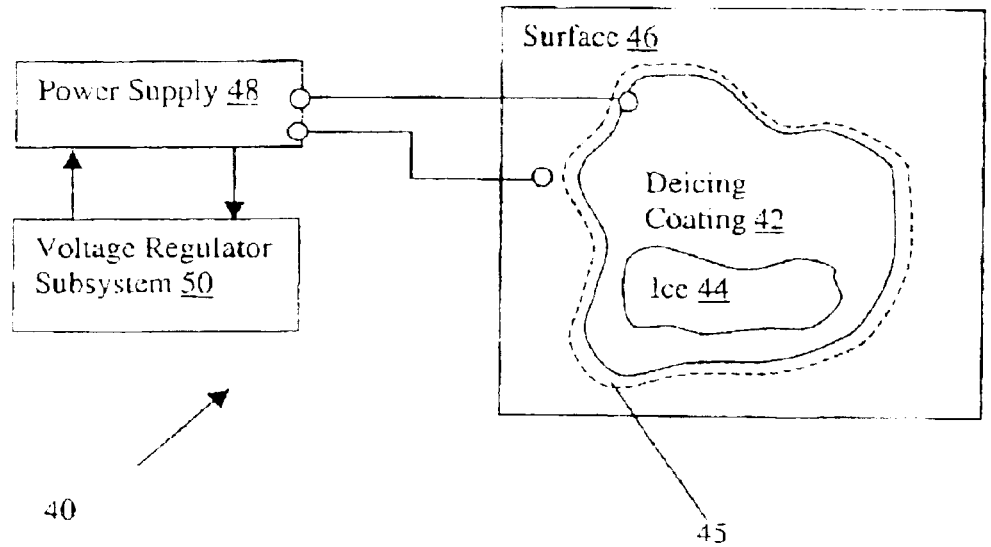
FIG. 2 shows an alternate deicing system incorporating an electrical coating to deice surfaces in accord with the invention.

FIG. 2 shows one system 40 incorporating an electrical deicing coating 42 to affect ice 44 that might adhere to conductive surface 46. Conductive surface 46 may for example be an airplane wing, helicopter blade, jet inlet, heat exchanger for kitchen and industrial equipment, refridgerator, road signs ship overstructures, or other object subjected to cold, wet and ice conditions. More specifically, coating 42 is applied over surface 46 to protect surface 46 from ice 44. Coating 42 is preferably flexible so as to physically conform to the shape of surface 46. In operation, a voltage is applied between coating 42 and surface 46 by power supply 48. The bias voltage applied to coating 42 may be equal and opposite to the bias voltage applied to surface 46. If desired, an insulator 45 may be disposed between coating 42 and surface 46; insulator 45 preferably comprises a dielectric mesh configuration described below.

Typically the voltage between coating 42 and surface 46 is over two volts and generally between two and one hundred volts, with higher voltages being applied for lower temperatures.

When voltage is applied, ice 44 decomposes into gaseous oxygen and hydrogen through electrolysis. Further, gases form within ice 44 generating high-pressure bubbles that exfoliate ice 44 from coating 42 (and hence from surface 46). Typical current density applied to coating 42 is between about 1–10 mA/cm^2. If desired, voltage regulator subsystem 50 is connected in feedback with power supply 48, and hence with the circuit formed by coating 42, surface 46, and ice 44, so as to increase or decrease DC voltage applied to coating 42 according to optimum conditions.

Systems 10, 40 thus modify the electrostatic interactions which form the bonding between ice and metals. These interactions are effectively changed (either reduced or enhanced) by application of the small DC (direct current) bias between ice and the metals. As described below, the composite coating comprises metal electrode wires separated by dielectric insulator fibers in a flexible format so as to be applied to surface 16 needing protection from ice. By applying a dc bias, the ice adhesion strength between ice and the electrodes of coating, as well as between ice and surface, is modified.

Ice has certain physical properties which allow the present invention to selectively modify the adhesion of ice to conductive (and semi-conductive) surfaces. If a charge is generated on the surface coming on contact with ice, it is possible to selectively modify the adhesion between the two surfaces. First, ice is a protonic semiconductor, a small class of semiconductors whose charge carriers are protons rather than electrons. This phenomenon results from hydrogen bonding within the ice. Similar to typical electron-based semiconductors, ice is electrically conductive, although this electrical conductivity is generally weak.

Another physical property of ice is that its surface is covered with a liquid-like layer ("LLL"). The LLL has important physical characteristics. First, the LLL is only nanometers thick. Second, it ranges in viscosity from almost water-like, at temperatures at or near to freezing, to very viscous at lower temperatures. Further, the LLL exists at temperatures as low as −100° C.

The LLL is also a major factor of ice adhesion strength. The combination of the semiconductive properties of ice and the LLL allows one to selectively manipulate ice adhesion strength between ice and other objects. Generally, water molecules within a piece of ice are randomly oriented. On the surface, however, the molecules are substantially oriented in the same direction, either outward or inward. As a result, all their protons, and hence the positive charges, either face outward or inward. While the exact mechanism is unknown, it is likely that the randomness of water molecules transitions to an ordered orientation within the LLL. However, the practical result of the ordering is that a high density of electrical charges, either positive or negative, occurs at the surface. Accordingly, if a charge is generated on the surface coming on contact with ice, it is possible to selectively modify the adhesion between the two surfaces. As like charges repel and opposites attract, an externally applied electrical bias at the interface of the ice and the other surface either reduces or enhances the adhesion of the ice to the other object.

Ice includes polar water molecules that strongly interact with any solid substrate which has dielectric permittivity different from that of ice. In addition, there is theoretical and experimental evidence for the existence of a surface charge in ice. This surface charge can also interact with the substrate.

Electrolysis is an important factor. When a dc current flows through ice, gaseous hydrogen ($H_2$) and oxygen ($O_2$) accumulate at the ice interfaces in the form of small bubbles, due to ice electrolysis. These bubbles play a role in the development of interfacial cracks, reducing the ice adhesion strength.

Figure 3:
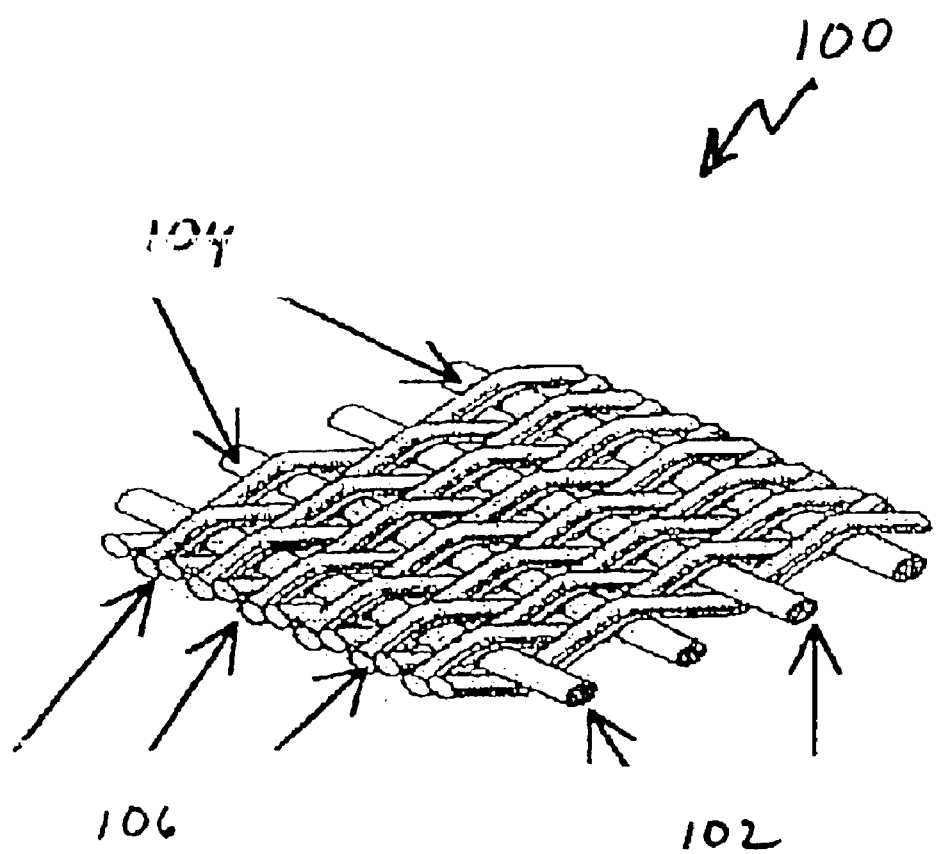
FIG. 3 depicts a composite coating having cathode wires and anode wires in accordance with the invention that operates to modify the adhesion of ice formed on a surface.

FIG. 3 depicts a composite coating 100 having cathode wires 102 and anode wires 104, in accordance with the invention. Dielectric wires 106 form an insulating weave about wires 102, 104 to prevent shorting. Wires 102, 104 for example connect to power supply 18 (or supply 48) such that appropriate current density affects ice adhering to coating 100. Typically, the current density is made to decrease adhesion strength between ice and coating 100, such that coating 100 operates to protect surfaces, such as surface 16, from ice. Typical spacings between wires 102 are 10–50 μm; typical spacings between wires 104 are also 10–50 μm. Wires 102,104 are for example made from gold, platinum plated titanium or niobium, or from metal with high resistance to electro-corrosion.

Figure 4:
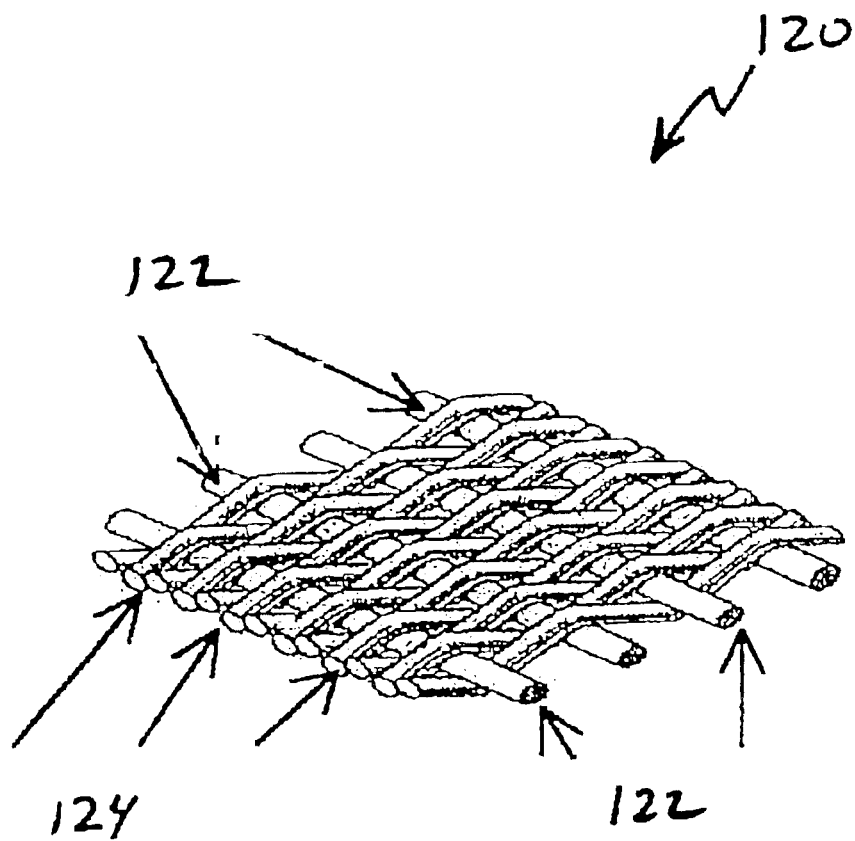
FIG. 4 depicts a composite coating in accordance with the invention in which the electrode wires have the same bias.

FIG. 4 depicts a composite coating 120 in accordance with the invention. Coating 120 has alternating electrode wires 122, each with equal bias from the connected power supply. Coating 120 may for example be applied to surface 46 of FIG. 2, where surface 46 is conductive; a voltage potential exists between surface 46 and wires 122. An insulating mesh 124 prevents wires 122 from shorting, and further prevents shorting between wires 122 and surface 46. Ice 44 completes the circuit between wires 122 and surface 46 to invoke the ice adhesion modifications of the invention.

Figure 5:
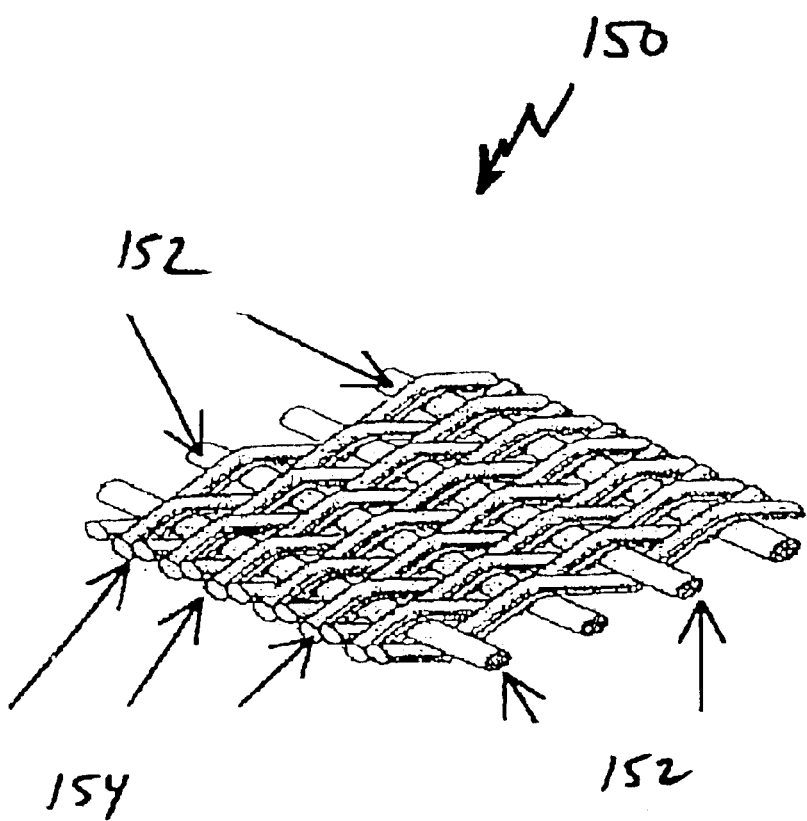
FIG. 5 depicts a wire mesh in accordance with the invention.

FIG. 5 depicts a wire mesh coating 150 constructed in accordance with the invention. Mesh coating 150 is generally conductive, with both wires 152 and weave components 154 being conductive. Mesh coating 150 is thus applied to conductive surface 46 with an insulator 45 disposed therebetween. Insulator 45 is constructed so as to protect surface 46 when ice 44 completes the circuit between mesh coating 150 and surface 46. A voltage potential between mesh coating 150 and surface 46 modifies the adhesion strength of ice 44 as desired.

A typical current density applied to coatings of the invention are from 1 to 10 mA/cm$^2$. Operating voltages are typically in the range of from 2 to about 100 volts, depending on ice temperature and spacing between wires. The lower the temperature, the higher the voltage required. The larger the interwire spacing, the higher the voltage required. For a typical temperature of −10° C. and a spacing of 50 μm, a bias of approximately 20 volts provides a current density of about 10 mA/cm$^2$ through very pure ice.

It is important that anode wires 104, FIG. 3) have a very high resistance to anodic corrosion. For that, they may be coated with thin layers of platinum or gold or amorphous carbon. Other alloys may also be applied. Cathode wires 102 should also be impenetrable to hydrogen. Examples of good cathode material include gold, copper, brass, bronze, and silver.

A composite coating or wire mesh in accordance with the invention is flexible. It can protect a wide variety of surface materials and shapes, including, as examples: airplane wings, helicopter blades, protective grids on jet engine inlets, heat exchangers of kitchen and industrial refrigerators, road signs, and ship superstructures.

The wire meshes and composite coatings described herein can be fabricated using conventional methods used in industry. An inventive mesh or composite coating can be applied to a surface by simply stretching it over the surface with a thin layer of adhesive placed between the composite coating or mesh and the surface.

In view of the foregoing, what is claimed is:

1. A system for modifying ice adhesion strength of ice adhered to an electrically conductive surface, comprising:
    a composite coating having a wire mesh covering the surface, the coating including electrically conductive wires;
    an electrically nonconductive insulating layer between the coating and the surface; and
    a DC power source for applying a DC bias between the mesh and the surface via a circuit formed with the ice.

2. A system as in claim 1, further comprising an adhesive for adhering the composite coating to the surface.

3. A system as in claim 1, wherein the surface and the wire mesh are connected to opposing ends of the DC power source.

4. A system of claim 1, wherein the DC bias provides between about 1–10 mA/cm^2 current density with the ice.

5. A system of claim 1, wherein the DC bias provides between about 2–100 voltage potential between the surface and the mesh.

6. A system for modifying ice adhesion strength of ice adhered to an electrically conductive surface, comprising:

a composite coating covering the surface, the coating having a plurality of electrically conductive electrode wires and a plurality of electrically insulating insulator fibers, the insulator fibers separating each of the electrode wires from one other and insulating the electrode wires from the surface;

a DC power source for applying a DC bias between the electrode wires and the surface via a circuit formed with the ice.

7. A system as in claim 6, further comprising an adhesive for adhering the composite coating to the surface.

8. A system as in claim 6 wherein the surface is connected to one end of the DC power source and the electrode wires are connected the opposing end of said DC power source.

9. A system as in claim 6 wherein the electrode wires include cathode wires and anode wires.

10. A system as in claim 6 wherein the composite coating is a composite cloth.

11. A system as in claim 10 wherein the composite cloth is woven from the electrode wires and the insulator fibers.

12. A system as in claim 11 wherein the electrode wires are woven in a direction generally perpendicular to the insulator fibers.

13. A system of claim 6, wherein the electrode wires are constructed from one of gold, copper, brass, bronze, silver and mixtures thereof.

14. A system of claim 13, further comprising a coating over the wires, the coating being selected from the group of platinum, gold and amorphous carbon.

15. A system of claim 6, wherein the electrode wires comprise anode and cathode wires, the power source alternately generating a bias between the surface and the anode wires and between the surface and the cathode wires.

16. A system for modifying ice adhesion strength of ice adhered to a surface, comprising:

a composite coating covering the surface, the coating having a plurality of cathode wires, a plurality of anode wires, and electrically insulating insulator fibers, the insulator fibers insulating the cathode wires from the anode wires;

a DC power source for applying a DC bias between the cathode and anode wires via a circuit formed with the ice.

17. A system as in claim 16 wherein the cathode wires are connected to one of the DC power source and the anode wires are connected to another end of the DC power source.

18. A system according to claim 16, wherein the DC power source is a battery.

19. A system according to claim 16, wherein the surface comprises a surface of an aircraft wing.

20. A system according to claim 16, wherein the surface comprises a surface of a power line.

21. A system as in claim 16, further comprising an adhesive for adhering the composite coating to the surface.

22. A system as in claim 16, wherein the composite coating is a composite cloth.

23. A system as in claim 22, wherein the composite cloth is woven from the cathode wires, the anode wires, and the insulator fibers.

24. A system as in claim 23, wherein the cathode and anode wires are woven in a direction generally perpendicular to the insulator fibers.

25. A system of claim 16, wherein the cathode wires are constructed from one of gold, copper, brass, bronze, silver and mixtures thereof.

26. A system of claim 16, wherein the anode wires are constructed from one of gold, copper, brass, bronze, silver and mixtures thereof.

27. A system of claim 26, further comprising a coating over the anode wires, the coating being selected from the group of platinum, gold and amorphous carbon.

* * * * *